May 31, 1955
B. R. WRIGHT
2,709,681
WASTE DISPOSAL UNIT
Filed June 30, 1951
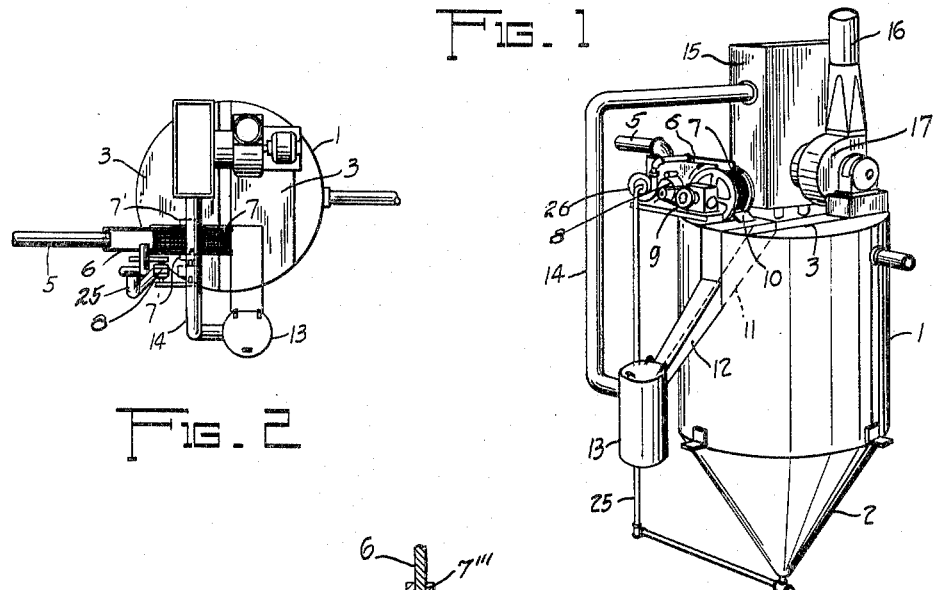
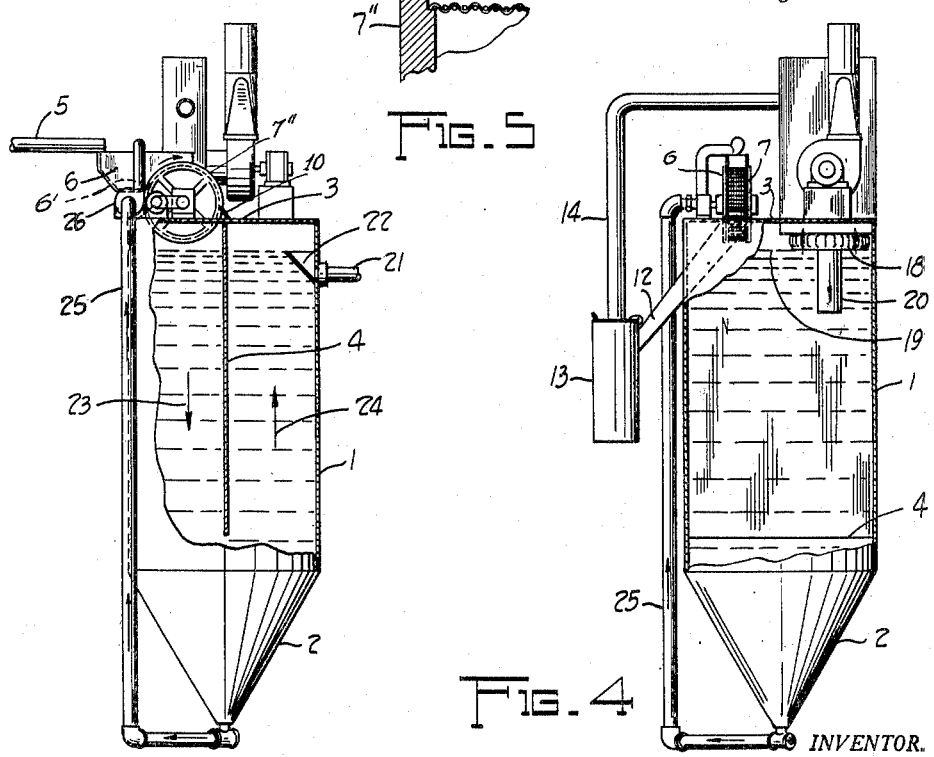
INVENTOR.
BRUCE R. WRIGHT

United States Patent Office 2,709,681
Patented May 31, 1955

2,709,681

WASTE DISPOSAL UNIT

Bruce R. Wright, Cleveland, Ohio, assignor to The Hawley Engineering Corporation, Cleveland, Ohio, a corporation of Ohio Application June 30, 1951, Serial No. 234,519

3 Claims. (Cl. 210—5)

My invention is an improvement in waste disposal units which is particularly adapted for use in disposing of sewage, ground garbage, or other organic wastes. The apparatus is particularly useful in disposing of wastes from steamships, hospitals, industrial plants and the like.

One of the objects of my invention is to provide a unit of this type which is extremely simple in construction, is compact and which is easily installed.

Another object of my invention consists in a device of this nature having high efficiency in operation.

A further object of the invention is a provision for treating the waste material by aeration.

A still further object of the invention is to operate the unit in such a manner that the materials passing therethrough may be recirculated a plurality of times, if desired.

Another object of my invention is the prevention of the packing of sludge in the apparatus, thereby eliminating, at least to a very great extent, the sludge problem which is present in waste disposal units of present-day types.

Further objects of the invention include an apparatus which requires low initial and operating costs to maintain it, an apparatus which, by its construction and operation, prevents the escape of odors from the apparatus to the adjacent atmosphere, but which provides for carrying of these odors to the outside atmosphere.

Other objects and advantages of my invention will become more apparent as the following description of an embodiment thereof progresses, reference being made to the accompanying drawing in which like reference characters are employed to designate like parts throughout the same.

Figure 1 is a perspective view of an apparatus embodying my invention.

Figure 2 is a top plan view of the apparatus shown in Figure 1.

Figure 3 is a side view of the same, partly broken away to illustrate the path travelled by the material in the tank.

Figure 4 is a front elevation of the device illustrated in the other figures in which the tank is shown, partly broken away, and, Figure 5 is a fragmentary view of a peripheral section of the rotary screen.

In carrying out my invention, I provide a vertically disposed retention tank which is indicated at 1, terminating at its bottom end in an inverted cone portion 2, and having plates 3 extending across the top of the tank for supporting certain elements employed with the apparatus. It is preferred that the tank 1 and the bottom section 2 be constructed from corrosion-resistant steel plate. A vertically-disposed partition 4 bisects the tank vertically and extends downwardly in the tank from the top thereof to a point just above the top of the inverted cone section 2.

The waste material, such as ground garbage, sewage, and other organic waste materials, enters the apparatus through an intake pipe or conduit 5 which is located above the top of the tank and which communicates with a receptacle 6 which is mounted on one of the top plates 3 of the tank and is so disposed that it will deliver the wastes into the receptacle. I have provided a rotary screen 7 which is mounted for rotation on pillow blocks 7' near the outlet end of the receptacle 6 and which operates partially therein for the purpose of screening the waste material as it passes out of the receptacle 6 into the tank 1. As shown in Figure 5, the rotary screen is provided with side members or rims 7" having peripheral grooves 7'" which slidably receive the adjacent forward edges of the side walls of the receptacle 6. There is also provided a wiper in the bottom forward part of the receptacle 6 at 6' which lies against and across the screen mesh to seal the space or clearance between the screen mesh and the transverse forward edge of the receptacle adjacent the mesh thereby to guide liquids from the receptacle toward the mesh where such liquids will flow through the screen and into the tank 1, the screenings clinging to the screen will be delivered to the scraper 10 for removal as the peripheral movement of the screen advances in the direction of the arrow in Figure 3. The rotary screen is powered by a motor 8 having a drive through a speed reducer 9 to the shaft of the rotary screen 7.

Screenings from the body of waste material which are separated from the liquid are removed from the surface of the screen by the scraper 10 and are thereby guided into a chute 11 having its receiving end within the tank 1 and projecting through the side wall of the tank as at 12 to discharge the screenings by gravity into a container 13 mounted exteriorly of the tank but in close proximity thereto. These screenings collected in the container 13 may be disposed of directly by incineration, steam or gas drying, by treatment with acid or by any other suitable means. This container 13 is provided with a vapor and gas discharge pipe 14 extending upwardly therefrom and communicating with an aeration box 15 mounted on one of the plates 3 of the tank 1, to communicate gases and fumes from the container 13 to the aeration box or chamber. From the aeration chamber of box 15 these gases and odors may be blown out of the stack 16 by means of a blower 17 which is also supported on the top of the tank 1.

The liquid waste, after leaving the screen 7 falls into the tank 1 where aeration treatment is given the liquid. The bottom of the chamber 15 is open to the interior of the tank 1 and I have provided means for aerating the liquid before it passes from the tank into the chamber 15, such means being illustrated generally at 18 in Figure 4. This means preferably comprises a tuyère having a circumferential series of spaced blades so disposed that air passing between the blades and through the tuyère will be subjected to a whirling action as it passes upwardly out of the tuyère and into the chamber 15. It will be noted from Figure 4 that the tuyère 18 is carried by the bottom of the chamber 15 and is disposed closely adjacent to the liquid level 19 in the tank 1. Depending from the bottom of the chamber 15 and extending well below the liquid level in the tank 1, is a drain or a return for liquid which, after contacting air and passing into the chamber 15, falls to the bottom of the chamber 15 and drains back through the tube 20 into the tank 1.

The tank is provided with an outlet 21 near the top thereof, there being a shield 22 diagonally disposed from the outlet upwardly in the tank to maintain the liquid level in the tank above the outlet.

It will be noted from Figure 3 that the flow of the liquid waste is downward from the intake at 6 in the left-hand side of the tank 1, as shown by the arrow 23 and thence around the partition 4 and upwardly in the right-hand side of the tank as shown by the arrow 24, the settlings being collected in the inverted cone section at the bottom of the tank as at 2. The apex of this section communicates with a pipe or conduit 25 with the receptacle 6, there being provided a pump 26 to draw the settlings and some of the liquid waste upwardly into the receptacle 6 from the bottom of the tank. In this way the settlings have not been permitted to pack on the bottom 2 of the tank, but by recirculating the same, the settlings and sludge are passed through the rotary screen 7 where additional solid matter may be scraped off and deposited into the container 13, the liquid again passing in the direction of the arrows in Figure 3.

Air within the tank is drawn upwardly through the tuyère 18 and into the aeration chamber 15 by means of the blower 17. As the air passes into the tuyère, it picks up liquid waste from the surface of the liquid body in the tank 1 and thoroughly atomizes it and contacts it as it passes through and leaves the tuyère. This liquid, after contacting air, falls to the floor of the aeration box and drains back into the tank 1 several inches below the liquid level therein.

While I have shown a single tuyère 18, it will be understood that additional tuyères may be used for the purposes described above.

It will also be understood that by providing means whereby the waste materials may be recirculated through an apparatus of this kind and be subjected to aeration each time it is circulated and wherein sludge and solid particles are removed from the flow during each circulation, that a very thorough disposal of waste is, without objectionable odors and without the formation of packed sludge, accomplished in a very efficient manner.

Various changes may be made in the details of construction and arrangement of parts without departing from the spirit of invention or the scope of the subjoined claims.

I claim:

1. A waste disposal unit comprising a detention tank, a partition depending from the top of said tank to a point short of the bottom thereof and dividing the tank into an inlet side and an outlet side, a receiver for waste material supported above the tank on the inlet side of said partition, a rotatable screen mounted on the tank top and projecting into the tank on the inlet side of said partition, means to rotate the screen, a scraper contacting the screen whereby solids may be removed from the screen as the screen is rotated, a receptacle outside said tank for receiving said solids, an aeration chamber on the inlet side of said tank for aerating liquid waste in said tank, a waste conduit communicating said outside receptacle with the aeration chamber, a blower for drawing air from said tank into said chamber, atomizing means on the tank on the inlet side of the partition whereby liquid waste drawn into said means will be contacted by the air passing therethrough, said aeration chamber having an open bottom communicating with the interior of the tank on its inlet side, and means for returning released liquids to said tank.

2. A waste disposal unit comprising a detention tank, a partition depending from the top of said tank to a point short of the bottom thereof and dividing the tank into an inlet side and an outlet side, a receiver for waste material supported above the tank on the inlet side of said partition, a rotatable screen mounted on the tank top and projecting into the tank on the inlet side of said partition, means to rotate the screen, a scraper contacting the screen whereby solids may be removed from the screen as the screen is rotated, a receptacle outside said tank for receiving said solids, an aeration chamber on the inlet side of said tank for aerating liquid waste in said tank, a waste conduit communicating said outside receptacle with the aeration chamber, a blower for drawing air from said tank into said chamber, atomizing means on the tank on the inlet side of the partition whereby liquid waste drawn into said means will be contacted by the air passing therethrough, said aeration chamber having an open bottom communicating with the interior of the tank on its inlet side, means for returning released liquids to said tank, a sediment chamber in the base of said tank, a conduit communicating said chamber with said receiver, and a pump for drawing settlings and liquid waste from said chamber through said conduit to said receiver whereby to recycle said waste material in the apparatus.

3. A waste disposal unit comprising a detention tank, a partition depending from the top of said tank to a point short of the bottom thereof and dividing the tank into an inlet side and an outlet side, a receiver for waste material supported above the tank on the inlet side of said partition, a rotatable screen mounted on the tank top and projecting into the tank on the inlet side of said partition, means to rotate the screen, a scraper contacting the screen whereby solids may be removed from the screen as the screen is rotated, a receptacle outside said tank for receiving said solids, an aeration chamber on the inlet side of said tank for aerating liquid waste in said tank, a waste conduit communicating said outside receptacle with the aeration chamber, a blower for drawing air from said tank into said chamber, atomizing means on the tank on the inlet side of the partition whereby liquid waste drawn into said means will be contacted by the air passing therethrough, said aeration chamber having an open bottom communicating with the interior of the tank on its inlet side, and means for returning released liquids to said tank, said atomizing means comprising a tuyère having a circumferential series of spaced blades angularly disposed to subject the fluid passing therebetween to a whirling action.

References Cited in the file of this patent

UNITED STATES PATENTS

| 421,253 | Dore | Feb. 11, 1890 |
| 1,976,956 | MacLean | Oct. 16, 1934 |
| 2,114,601 | Laughlin | Apr. 19, 1938 |
| 2,118,370 | Wessblad et al. | May 24, 1938 |
| 2,553,228 | Yonner | May 15, 1951 |

FOREIGN PATENTS

| 19,596 | Great Britain | of 1913 |
| 399,156 | France | June 23, 1909 |